United States Patent
Ogasawara et al.

(10) Patent No.: US 9,973,101 B2
(45) Date of Patent: May 15, 2018

(54) POWER CONVERSION DEVICE THAT CONVERTS AC TO AC

(71) Applicants: NATIONAL UNIVERSITY CORPORATION HOKKAIDO UNIVERSITY, Sapporo-shi, Hokkaido (JP); Omron Corporation, Kyoto-shi, Kyoto (JP)

(72) Inventors: Satoshi Ogasawara, Sapporo (JP); Agnes Hadinata, Sapporo (JP); Takashi Hyodo, Kusatsu (JP)

(73) Assignees: NATIONAL UNIVERSITY CORPORATION HOKKAIDO UNIVERSITY, Sapporo-shi; Omrom Corporation, Kyoto-shi ( * ) Notice: Subject to any disclaimer, the term of this patent is extended or adjusted under 35 U.S.C. 154(b) by 0 days. days.

(21) Appl. No.: 15/116,539

(22) PCT Filed: Jan. 27, 2015

(86) PCT No.: PCT/JP2015/052119
§ 371 (c)(1),
(2) Date: Aug. 4, 2016

(87) PCT Pub. No.: WO2015/118990
PCT Pub. Date: Aug. 13, 2015

(65) Prior Publication Data
US 2016/0352238 A1  Dec. 1, 2016

(30) Foreign Application Priority Data
Feb. 7, 2014  (JP) .................................. 2014-022291

(51) Int. Cl.
*H02M 5/04*  (2006.01)
*H02M 5/297*  (2006.01)
(Continued)

(52) U.S. Cl.
CPC ............... *H02M 5/04* (2013.01); *H02M 5/16* (2013.01); *H02M 5/297* (2013.01);
(Continued)

(58) Field of Classification Search
CPC ......... H02M 2001/0032; H02M 3/156; H02M 2001/0025; H02M 3/33507;
(Continued)

(56) References Cited

U.S. PATENT DOCUMENTS

2006/0262576 A1 * 11/2006 Przybyla ............... H02M 7/219
363/21.02
2014/0375287 A1 * 12/2014 Blanchard ........... H01L 29/0817
323/271

FOREIGN PATENT DOCUMENTS

JP  S56-086072 A  7/1981
JP  H03-007065 A  1/1991
(Continued)

OTHER PUBLICATIONS

Yaskawa Electric Corporation, Matrix converter technology, <URL: http://www.yaskawa.co.jp/technology/ynow/matrix> (retrieval date: Jun. 6, 2016).
(Continued)

*Primary Examiner* — Henry Lee, III
(74) *Attorney, Agent, or Firm* — Metrolexis Law Group, PLLC (57) ABSTRACT

A power conversion circuit uses a multiphase AC power source as an input and has a plurality of bidirectional switches each of which is connected to each phase of the multiphase AC power source. A switching control circuit controls the states of the plurality of bidirectional switches and switches a combination of two phases of the multiphase AC power source, relating to interphase voltage to be outputted from the power conversion circuit to a load side.

(Continued)

A resonant circuit is connected to an output side of the power conversion circuit. The switching control circuit, at a time of switching of the combination of the two phases that output the interphase voltage to the load side, switches the states of the bidirectional switches relating to the switching, by soft switching.

4 Claims, 9 Drawing Sheets

(51) Int. Cl.
*H02M 5/16* (2006.01)
*H02M 1/00* (2006.01)
(52) U.S. Cl.
CPC .... *H02M 2001/0058* (2013.01); *Y02B 70/145* (2013.01); *Y02B 70/1491* (2013.01)
(58) Field of Classification Search
CPC ......... H02M 3/33523; H02M 3/33584; H02M 2001/007; H02M 3/1588; H02M 1/14; H02M 1/15; H02M 2001/0048; H02M 3/3378; H02M 2003/1566
See application file for complete search history.

(56) References Cited

FOREIGN PATENT DOCUMENTS

| JP | 2010-263702 A | 11/2010 |
| WO | 2014-020898 A1 | 2/2014 |

OTHER PUBLICATIONS

Fuji Electric Co Ltd, The future of the AC power converter matrix converter "FRENIC-Mx series" released today, Mar. 6, 2006 <URL: http://www.fujielectric.co.jp/about/news/06030601/> (retrieval date: Jun. 6, 2016).

Ecklebe A et al, "Bidirectional Switch Commutation for a Matrix Converter Supplying a Series Resonant Load", IEEE Transactions on Power Electronics, May 1, 2009, pp. 1173-1181, vol. 24 No. 5.

Extended European search report dated Aug. 21, 2017 in the counterpart European patent application.

The Japanese office action letter dated Jan. 16, 2018 in a counterpart Japanese patent application.

* cited by examiner

POWER CONVERSION DEVICE THAT CONVERTS AC TO AC

TECHNICAL FIELD

The present invention relates to a power conversion device that uses a multiphase AC power source as an input and directly converts AC to AC.

BACKGROUND ART

Conventionally, a power conversion device (matrix converter) that uses a multiphase AC power source as an input and directly converts AC to AC has been known (mainly see Non Patent Literatures 1 and 2). Such a matrix converter, by turning ON/OFF a bidirectional switch that is connected to each phase of the multiphase AC power source as an input so as to switch a combination of two phases relating to interphase voltage to be outputted to a load side, outputs AC to the load side without converting the AC to DC. The matrix converter controls the switching of the bidirectional switch according to the voltage or frequency of the AC outputted to the load side.

Since the matrix converter directly converts AC to AC, the conversion loss of the matrix converter is smaller than the conversion loss of a power conversion device that uses an inverter that converts AC to DC and then converts the DC to AC again. In addition, since the matrix converter does not require an inverter circuit, the matrix converter is also excellent in miniaturization.

CITATION LIST

Non Patent Literature

Non Patent Literature 1:
http://www.yaskawa.co.jp/technology/ynow/matrix
Non Patent Literature 2:
http://www.fujielectric.co.jp/about/news/06030601/

SUMMARY OF INVENTION

Technical Problem

However, the matrix converter has sometimes performed the switching ON/OFF of the bidirectional switch by hard switching. The bidirectional switch is configured by a power semiconductor device such as an insulated gate bipolar transistor (IGBT). If the switching ON/OFF of the bidirectional switch is performed by the hard switching, the switching loss generated in the power semiconductor device becomes larger, which causes reduction in conversion efficiency. Additionally, the stress on the power semiconductor device is also large.

Moreover, if the switching loss is large, as the frequency of output voltage to be outputted to the load side is made higher, the conversion efficiency becomes lower, so that it has been difficult to make the frequency of the output voltage higher in the practical range.

An object of the present invention is to provide a power conversion device that significantly reduces switching loss and improves conversion efficiency and that reduces stress on a bidirectional switch and improves reliability.

Solution to Problem

In order to achieve the above object, a power conversion device according to the present invention includes a power conversion circuit, a switching control circuit, and a resonant circuit.

The power conversion circuit uses a multiphase AC power source as an input and has a plurality of bidirectional switches each of which is connected to each phase of the multiphase AC power source. The switching control circuit controls the states of the plurality of bidirectional switches and switches a combination of two phases of the multiphase AC power source, relating to interphase voltage outputted from the power conversion circuit to a load side. The resonant circuit is connected to an output side of the power conversion circuit.

The switching control circuit, at a time of switching of the combination of the two phases that output the interphase power to the load side, switches the states of the plurality of bidirectional switches relating to the switching, by soft switching. By the soft switching, either current or voltage rises from zero slowly at a switching timing of the switch, which reduces power loss calculated by the time integration of the voltage and the current.

In this configuration, the resonant circuit is installed, which delays the phase of output current with respect to the output voltage of the power conversion circuit, so that the states of the bidirectional switches are switched by soft switching in zero current sequence (ZCS). Accordingly, while the switching loss is able to be significantly reduced and the conversion efficiency is able to be improved, the stress on the bidirectional switch is able to be reduced and the reliability is able to be improved.

Furthermore, by making the frequency of the output voltage of the power conversion circuit substantially the same as the resonant frequency of the resonant circuit, the frequency of the output voltage is able to be made higher in the practical range. In other words, the resonant frequency of the resonant circuit may be determined according to the frequency of the output voltage of the power conversion circuit.

In addition, a capacitor may be connected in parallel with the bidirectional switch. Since this capacitor functions as a snubber capacitor, the states of the bidirectional switches are able to be switched by soft switching in zero voltage sequence (ZVS). Accordingly, while the switching loss is able to be significantly reduced and the conversion efficiency is able to be improved, the stress on the bidirectional switch is able to be reduced and the reliability is able to be improved.

Moreover, the bidirectional switch has two switching elements that are connected in reverse parallel to each other and is configured so that the capacitor is connected between a collector and an emitter of the switching elements, and the switching control circuit, at the time of switching of the combination of the two phases that output the interphase voltage to the load side, sequentially switches the states of the switching elements included in the bidirectional switch relating to the switching, by soft switching.

Advantageous Effects of Invention

According to the present invention, while the switching loss is able to be significantly reduced and the conversion efficiency is able to be improved, the stress on the bidirectional switch is able to be reduced and the reliability is able to be improved.

DETAILED DESCRIPTION OF PREFERRED EMBODIMENTS

Hereinafter, a power conversion device according to a preferred embodiment of the present invention will be described.

Figure 1:
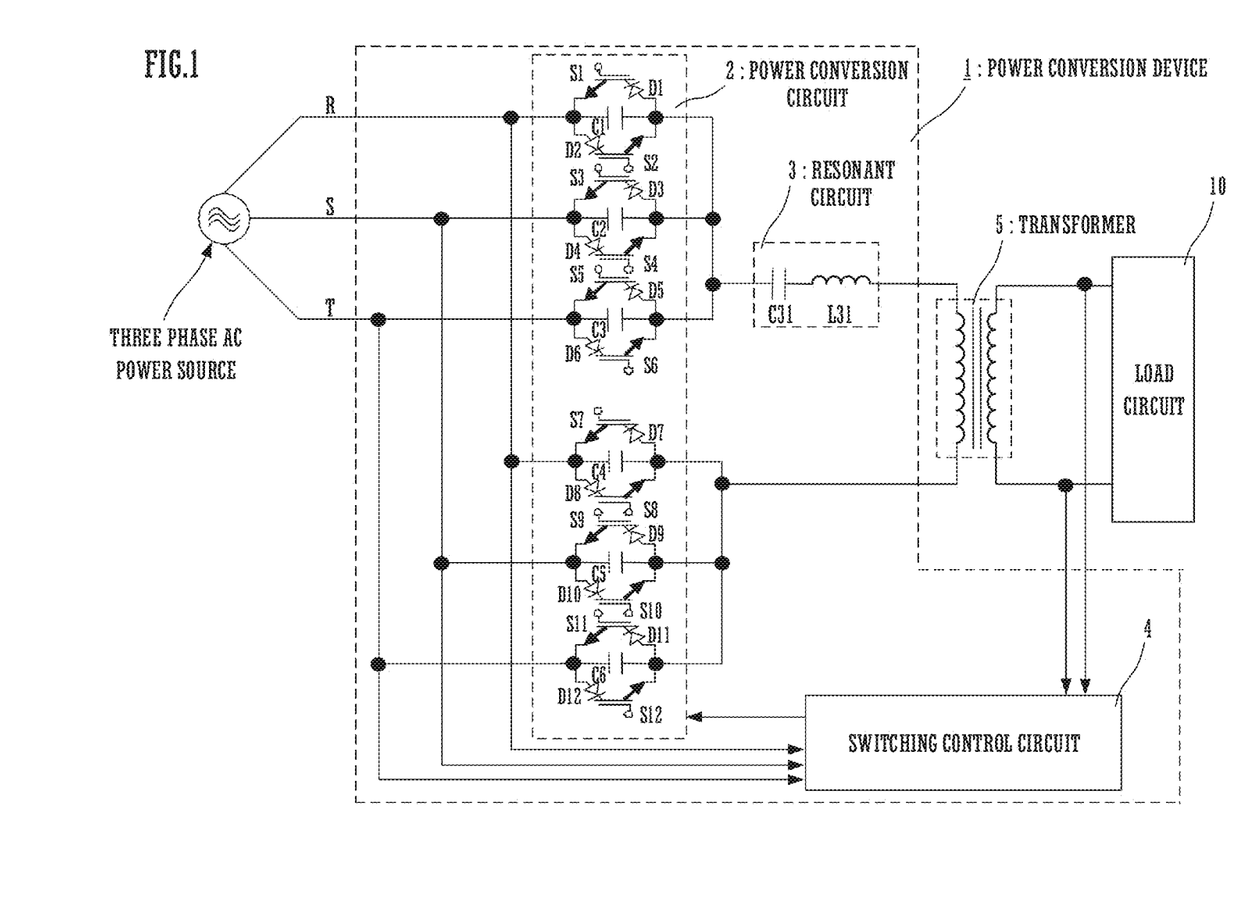
FIG. 1 is a schematic view showing a circuit configuration of a power conversion device.

FIG. 1 is a schematic view showing a circuit configuration of a power conversion device according to the present example. The power conversion device 1 is provided with a power conversion circuit 2, a resonant circuit 3, and a switching control circuit 4.

The power conversion device 1 uses a three phase AC power source as an input, and outputs single-phase AC voltage. The power conversion device 1 directly converts AC to AC.

The power conversion circuit 2 according to the present example is provided with six bidirectional switches. To each phase of the three phase AC power source as an input, two of the bidirectional switches are connected in parallel. The bidirectional switch is configured by two switches having a structure in which the switches are not reversely conducted, two diodes, and one capacitor. The six bidirectional switches have the same configuration.

This bidirectional switch will be described. Here, the bidirectional switch configured, as shown in FIG. 1, by the switching terminals S1 and S2, the diodes D1 and D2, and the capacitor C1 will be described by way of example. The switching elements S1 and S2 are semiconductor switches having a structure in which the switching elements are not reversely conducted, and are, for example, an insulated gated mode bipolar transistor (IGBT) or an MOSFET (Metal Oxide Semiconductor Field Effect Transistor). The bidirectional switch connects the two switching elements S1 and S2 in reverse parallel to each other. In addition, the collector of the switching elements S1 and S2 is connected to the diodes D1 and D2 in the forward direction. Furthermore, the capacitor C1 is connected between the collector and the emitter of the switching elements S1 and S2 that are connected in reverse parallel to each other. It is to be noted that the other five bidirectional switches shown in FIG. 1 have the same circuit configuration. The capacitors C1 to C6 each function as a snubber capacitor.

The power conversion circuit 2 is a matrix converter (MC). The power conversion circuit 2 outputs interphase voltage of any two phases of the three phase AC power source as an input. The selection of the two phases of the three phase AC power source relating to the interphase voltage outputted by the power conversion circuit 2 is performed by turning ON/OFF the switching elements S1 to S12. The switching control circuit 4 to be described later controls the ON/OFF of the switching elements S1 to S12.

The resonant circuit 3 is an LC circuit in which the capacitor C31 and a coil L31 are connected in series. The resonant circuit 3 is connected to the output of the power conversion circuit 2. The resonant frequency of the resonant circuit 3 is determined according to a frequency of AC voltage to be outputted from the power conversion circuit 2. Specifically, the resonant circuit 3 determines the sizes of the capacitor C31 and the coil L31 such that the resonant frequency also including a reactance component of a transformer 5 to be described later is substantially equal to the frequency of the AC voltage to be outputted from the power conversion circuit 2.

The switching control circuit 4 controls commutation operation in the power conversion circuit 2 by individually controlling the ON/OFF states of the switching elements S1 to S12 with which the power conversion circuit 2 is provided. As is publicly known, the commutation operation is an operation to switch the flow of electric current from an arbitrary phase in which the electric current flows, to another phase. The switching control circuit 4 supplies a gate signal generated individually, with respect to each of the switching elements S1 to S12. The switching control circuit 4 uses an input such as voltage of each phase of the three phase AC power source as an input or voltage across both ends of the load circuit 10, and generates a gate signal with respect to each of the switching elements S1 to S12 based on such an input. The switching control circuit 4 controls the switching elements S1 to S12 by a switching frequency corresponding to the frequency of the AC voltage to be outputted from the power conversion circuit 2.

The output of the power conversion device 1 is connected to the primary side of the transformer 5. Additionally, the load circuit 10 is connected to the secondary side of the transformer 5.

Figure 2:
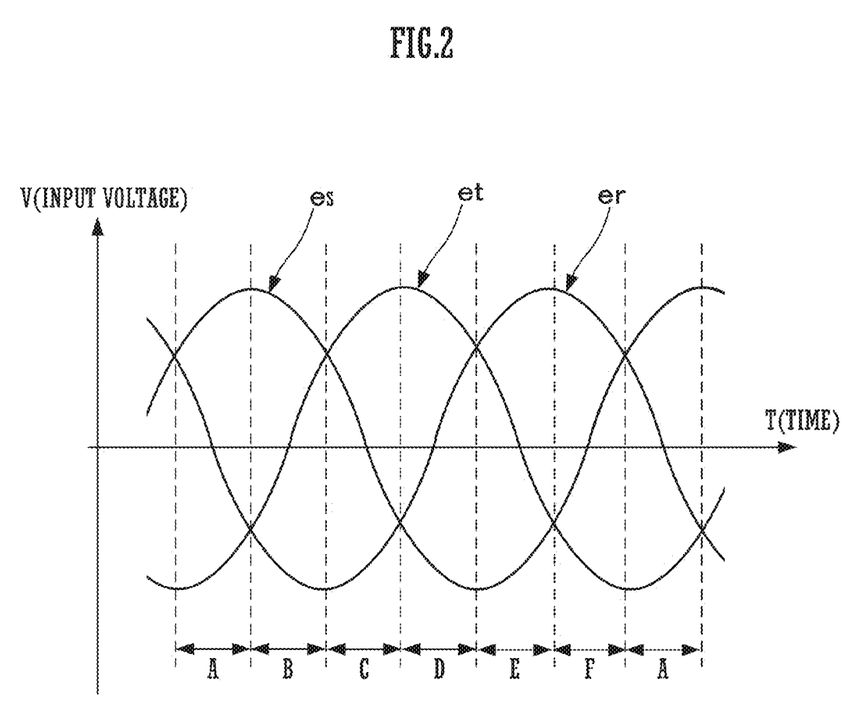
FIG. 2 is a view showing a voltage waveform of each phase of a three phase AC power source being an input.

FIG. 2 is a view showing a voltage waveform of each phase of the three phase AC power source as an input. The phases of the voltage waveforms $e_r$, $e_s$, and $e_t$ are shifted by ⅔π (120 degrees) from each other. The switching control circuit 4, for each of sections (Sections A to F as shown in FIG. 2) of six patterns classified according to the magnitude of the voltage of each phase, controls the states (ON/OFF states of the switching elements S1 to S12) of the six bidirectional switches of the power conversion circuit 2 by using a control pattern corresponding to the section. In other words, the control patterns (control patterns of the ON/OFF states of the switching elements S1 to S12) of the states of the bidirectional switches by the switching control circuit 4 are different in each section of the six patterns classified according to the magnitude of the voltage of each phase.

Figure 3:
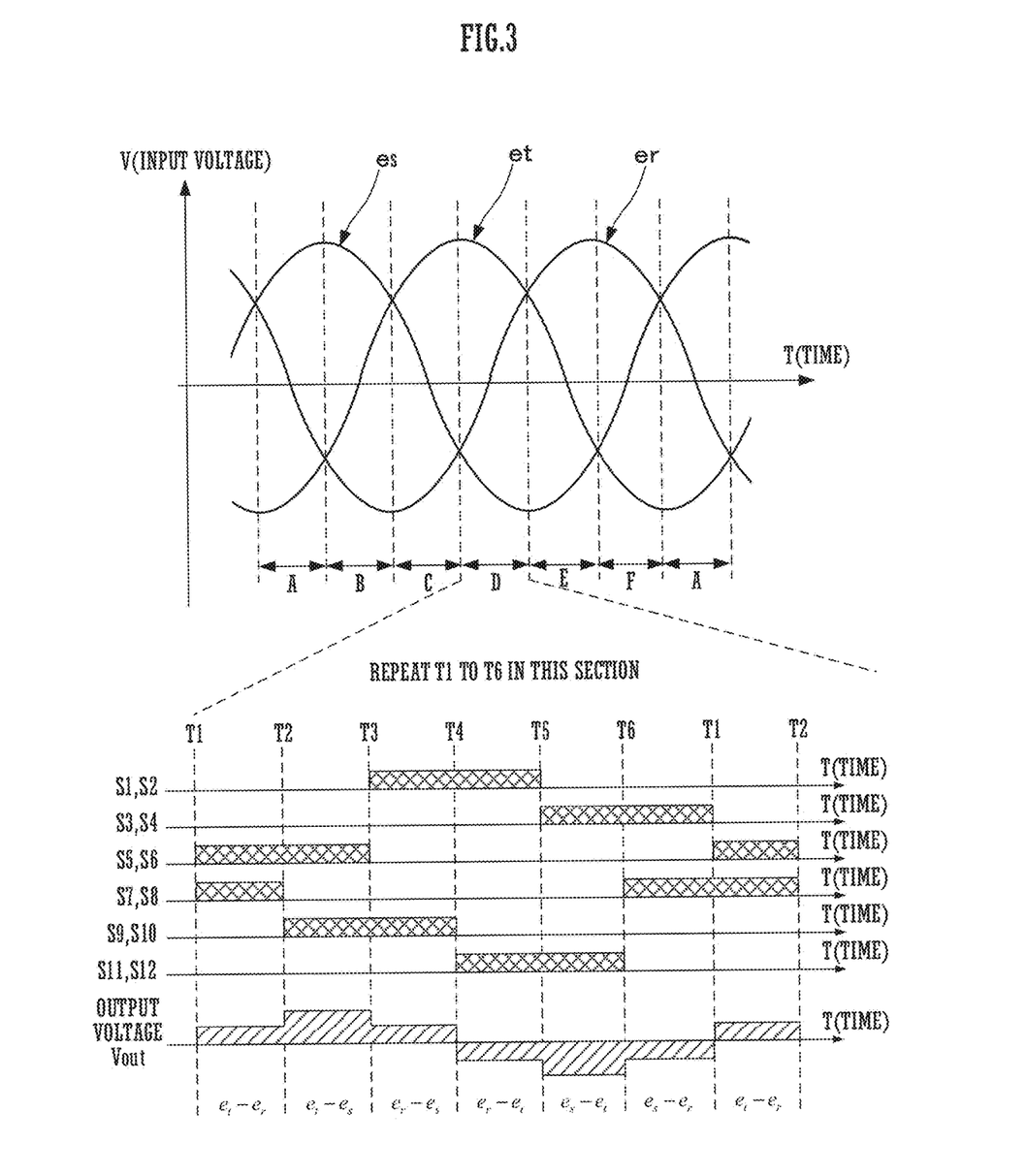
FIG. 3 is a schematic view showing a control pattern of each of switching elements in Section D.

FIG. 3 is a view showing the control pattern of each of the switching elements S1 to S12 in Section D shown in FIG. 2. The Section D is in the state of $e_t \geq e_r \geq e_a$. While, FIG. 3 shows two switching elements that configure a bidirectional switch as switching elements that are turned ON/OFF at the same timing, in practice, in order to prevent a short circuit of the power source and to secure a path in which load current flows back, the timing to turn ON/OFF the switching elements is different in the two switching elements that configure a bidirectional switch (details will be described later). FIG. 3 shows the ON sections of the switching elements S1 to S12 indicated by hatching.

As shown in FIG. 3, the switching control circuit 4 repeatedly switches ON/OFF the switching elements S1 to S12 (repeatedly switches ON/OFF the switching elements S1 to S12 in T1 to T6) so that the interphase voltage to be outputted from the power conversion circuit 2 is repeatedly switched in order of $(e_t-e_r) \to (e_t-e_s) \to (e_r-e_s) \to (e_r-e_t) \to (e_s-e_t) \to (e_s-e_r) \to (e_t-e_r)$. The output voltage of the power conversion circuit 2 may have a frequency corresponding to the time from T1 to the following T1 shown in FIG. 3. In other words, the switching control circuit 4 determines time (time of one cycle) from T1 to the following T1, based on the time determined according to the frequency of the interphase voltage (output voltage (Vout)) to be outputted from the power conversion circuit 2. Moreover, each of the timing T1 to T6 has a certain amount of time width.

T1 to T6 are timing for switching the states (ON/OFF states of the switching elements S1 to S12) of one of the bidirectional switches. In other words, T1 to T6 are the timing for switching the combination of the interphase voltage to be outputted from the power conversion circuit 2, and are not clock time. The time (between T1 and T2, between T2 and T3, between T3 and T4, between T4 and T5, between T5 and T6, between T6 and T1) to hold the state of the bidirectional switch may be constant or may not be constant. In FIG. 3, the time is made constant and the constant time is illustrated.

Figure 4:
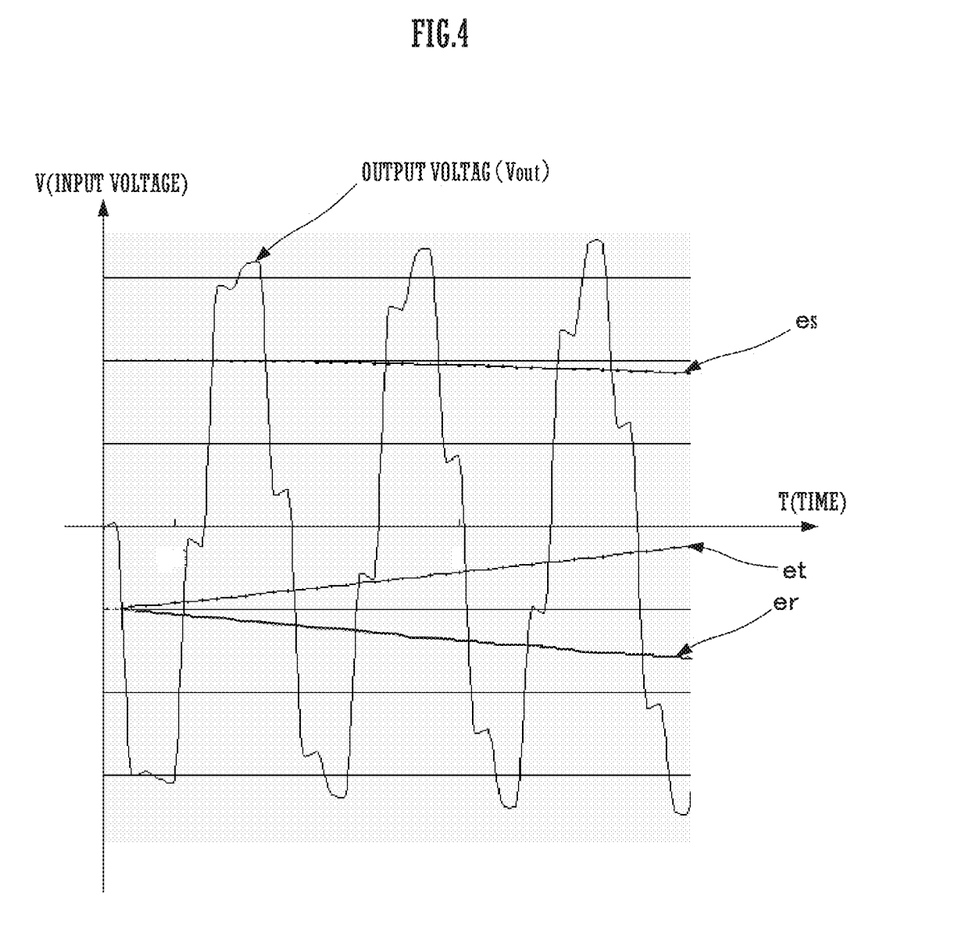
FIG. 4 is a view showing a waveform of the output voltage of the power conversion circuit in Section D.

FIG. 4 is a view showing a waveform of the output voltage of the power conversion circuit in Section D shown in FIG. 2. The interphase voltage as the output voltage of the power conversion circuit 2 in the Section D is expressed by [Equation 1].

$$e_t - e_s = V \left\{ \sin\left(\theta_L - \frac{4}{3}\pi\right) - \sin\left(\theta_L - \frac{2}{3}\pi\right) \right\} = V * \sqrt{3} \cos\theta_L \quad \text{[Equation 1]}$$

$$e_r - e_s = V \left\{ \sin\theta_L - \sin\left(\theta_L - \frac{2}{3}\pi\right) \right\} = V \left\{ \frac{3}{2} \sin\theta_L + \frac{\sqrt{3}}{2} \cos\theta_L \right\}$$

wherein V indicates power supply voltage and $\theta_L$ is a phase angle of $e_r$.

Figure 5:
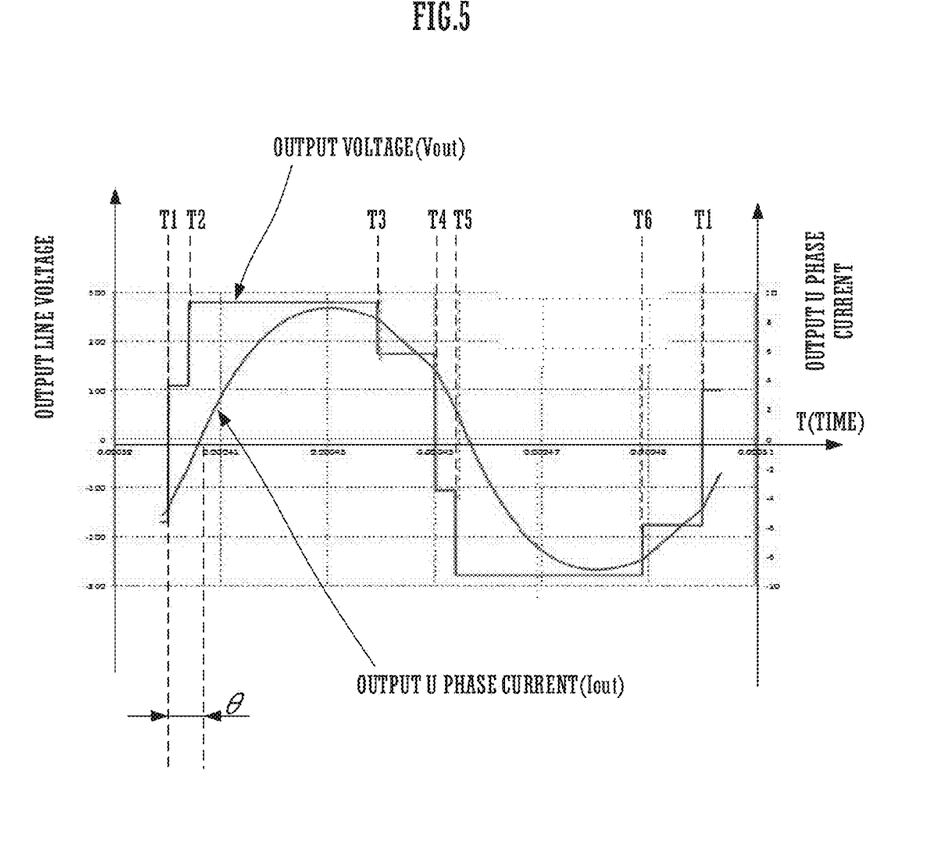
FIG. 5 is a view showing a relationship between the output voltage of the power conversion circuit and the output current of the power conversion circuit.

FIG. 5 is a view showing a relationship between the output voltage of the power conversion circuit and the output current of the power conversion circuit. As described above, the resonant circuit 3 is connected to the output of the power conversion circuit 2. Therefore, as shown in FIG. 5, the phase of the output current (Iout) of the power conversion circuit 2 is delayed only by time equivalent to the phase angle $\theta$ with respect to the output voltage (Vout) of the power conversion circuit 2.

It is to be noted that, in this FIG. 5 unlike FIG. 3, the time (between T1 and T2, between T2 and T3, between T3 and T4, between T4 and T5, between T5 and T6, between T6 and T1) to hold the state of the bidirectional switch is not constant. However, T1 to T6 shown in FIG. 3 correspond to T1 to T6 shown in FIG. 5.

Figure 6A:
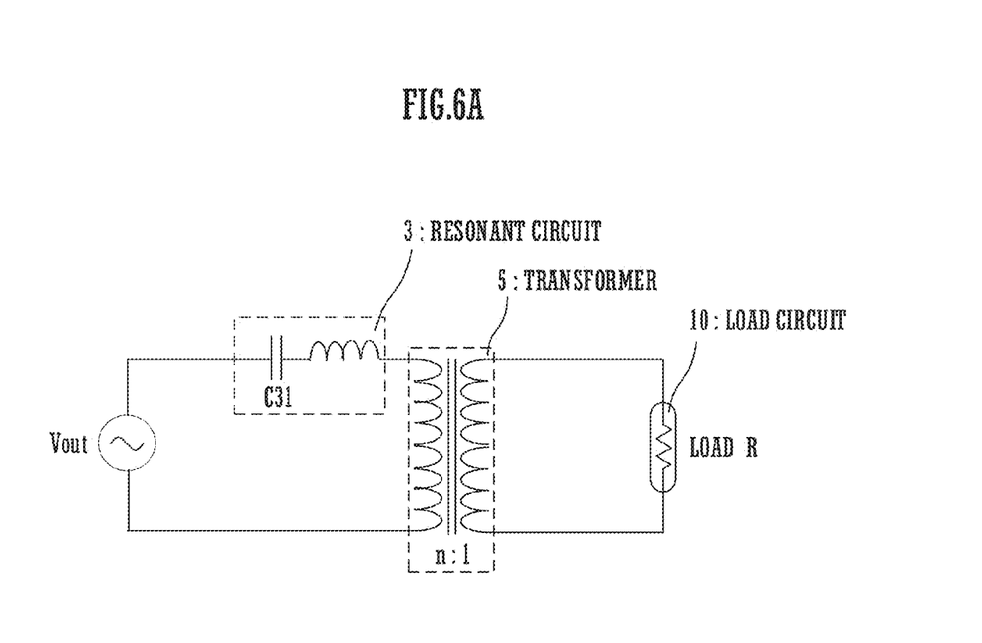
FIG. 6A shows an output side of the power conversion circuit.
Figure 6B:
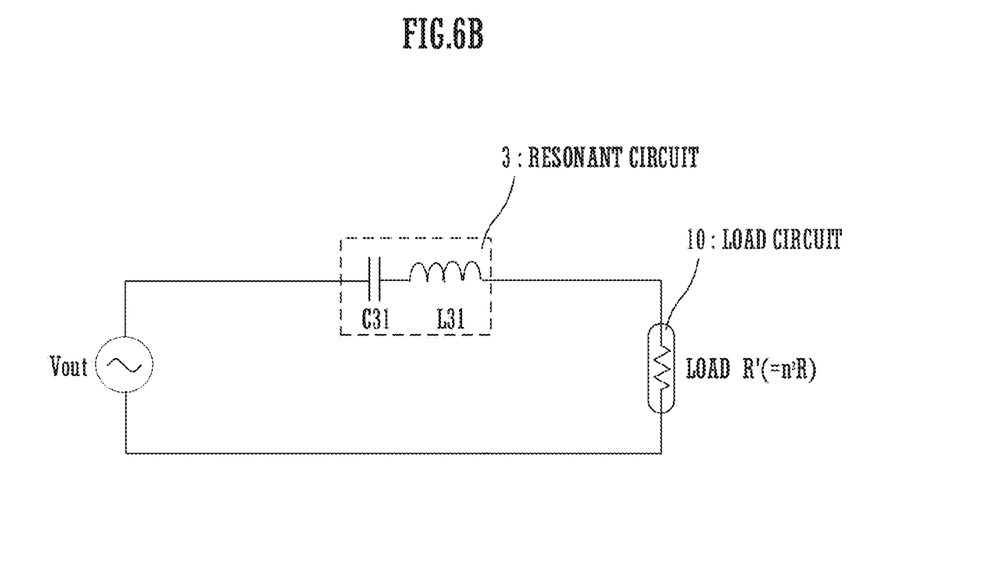
FIG. 6B shows an equivalent circuit of the power conversion circuit shown in FIG. 6A.
Figure 7A:
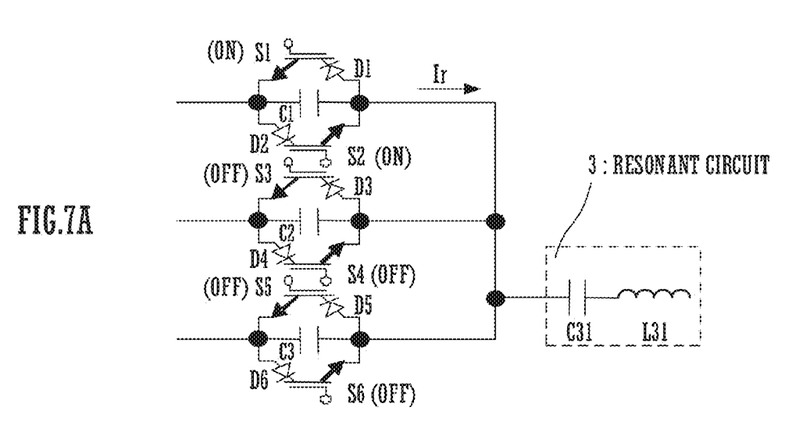
FIGS. 7A, 7B, and 7C are views showing a state change of the switching elements in commutation operation of the power conversion circuit.
Figure 7B:
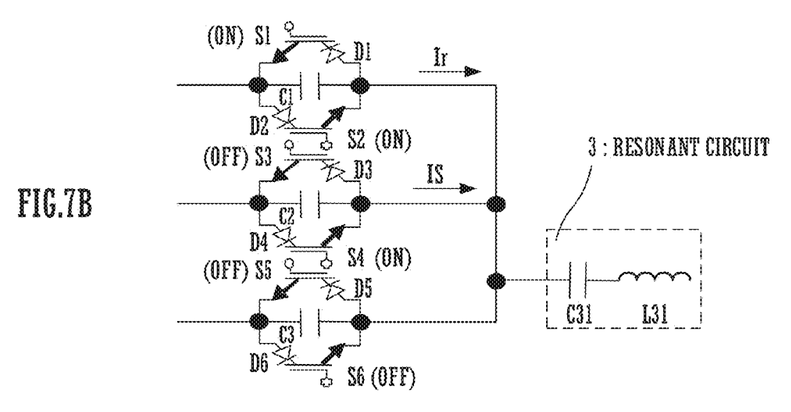
Figure 7C:
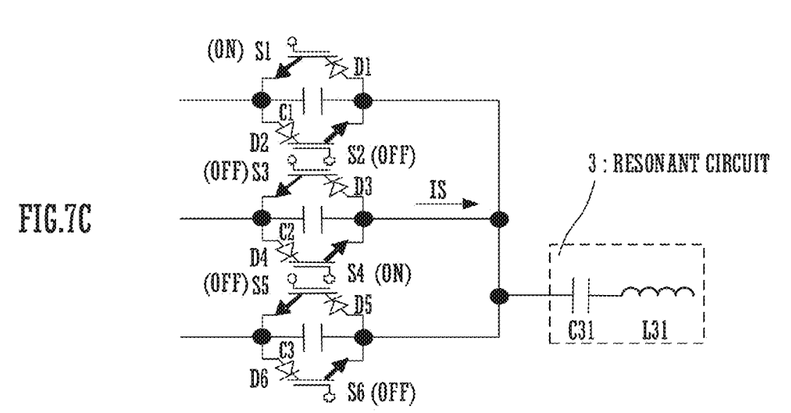
Figure 8A:
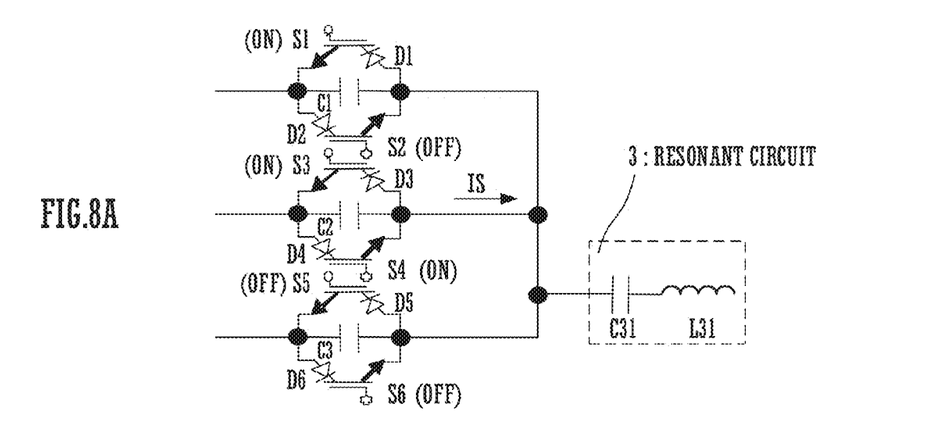
FIGS. 8A and 8B are views showing the state change of the switching elements in the commutation operation of the power conversion circuit.
Figure 8B:
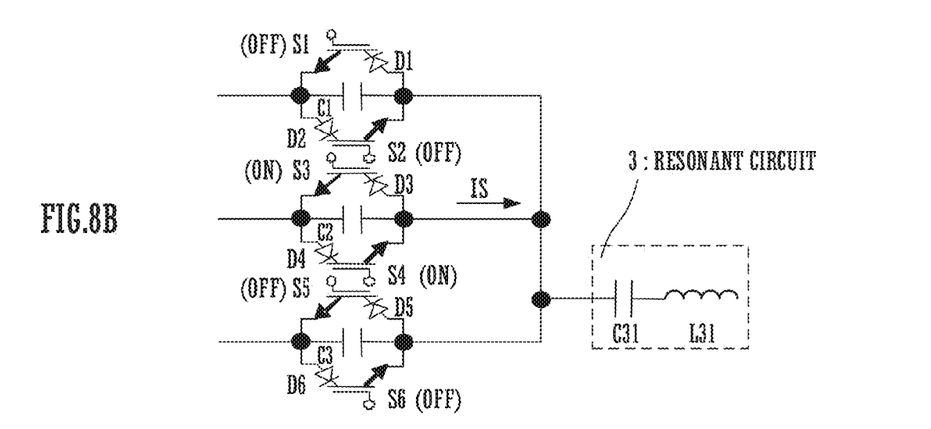

FIG. 6A shows the output side of the power conversion circuit, and FIG. 6B shows an equivalent circuit of the power conversion circuit shown in FIG. 6A. Since the resonant circuit 3 is used in a resonant state, the characteristic impedance is [Equation 2].

$$Z_o = \sqrt{\frac{(L31)}{(C31)}} = \omega_0(L31) = \frac{1}{\omega_o(C31)} \quad \text{[Equation 2]}$$

In addition, the resonant frequency $f_0$ is [Equation 3].

$$f_o = \frac{1}{2\pi\sqrt{(L31)(C31)}} \quad \text{[Equation 3]}$$

Then, the attenuation coefficient (of the resonant circuit 3 is [Equation 4].

$$\zeta = \frac{R'}{2Z_o} = \frac{n^2 R}{2} \sqrt{\frac{(C31)}{(L31)}} \quad \text{[Equation 4]}$$

Since the resonant circuit 3 causes the resonant frequency $f_0$ to be substantially the same as the frequency of the output voltage (Vout) of the power conversion circuit 2, the values of the coil L31 and the capacitor C31 may be determined so that the resonant frequency $f_0$ indicated in [Equation 3] may be substantially the same as the frequency of the output voltage (Vout) of the power conversion circuit 2 and the attenuation coefficient $\zeta$ indicated in [Equation 4] may become smaller.

Returning to FIG. 5, the phase delay $\theta$ and time delay $t_{delay}$ of the output current (Iout) of the power conversion circuit 2 with respect to the output voltage (Vout) of the power conversion circuit 2 are [Equation 5].

$$\theta = \arctan\left(\frac{\omega_o (L31) - \frac{1}{\omega_o(C31)}}{n^2 R}\right) \quad \text{[Equation 5]}$$

$$t_{delay} = Ts * \frac{\theta}{2\pi}$$

wherein
$\theta$ [rad]: current delay phase
Ts [sec]: current delay time
$\omega_o$ [Hz]: resonant frequency
L31 [H]: resonance reactor
C31 [F]: resonant capacitor
R [$\Omega$]: transformer secondary side load Here, the operation to switch the states of the bidirectional switches by the switching control circuit 4, relating to the commutation of the power conversion circuit 2 will be described. Specifically, the operation to switch the states of the bidirectional switch at timing T5 shown in FIG. 3 and FIG. 5 will be described by way of example.

At this timing T5, the switching elements S1 and S2 are switched from the ON state to the OFF state, and the switching elements S3 and S4 are switched from the OFF state to the ON state. As described above, the timing when the states of each of the switching elements S1 to S4 are switched is not the same timing.

Figure 9:
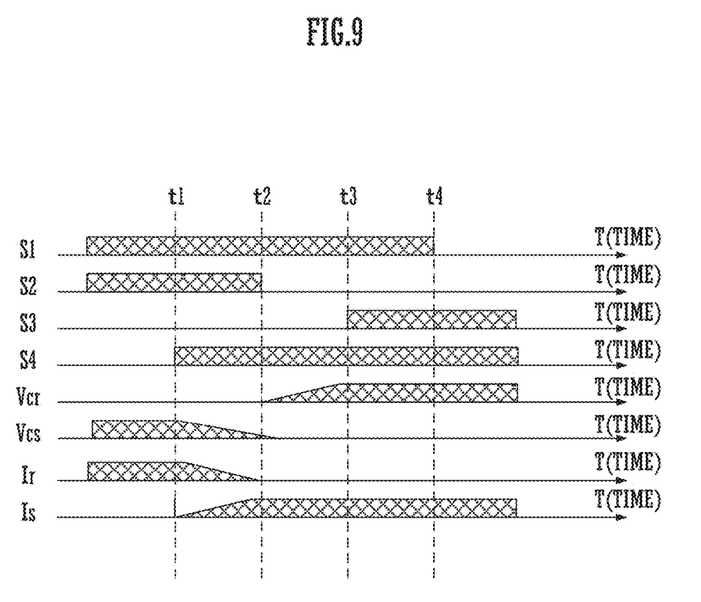
FIG. 9 is a time chart showing the state change of the switching elements in the commutation operation of the power conversion circuit.

FIG. 7A, FIG. 7B, FIG. 7C, FIG. 8A, and FIG. 8B are views showing the state change of the switching element in the commutation operation of the power conversion circuit. In addition, FIG. 9 is a time chart showing the state change of the switching element in the commutation operation of the power conversion circuit. The switching control circuit 4 switches the states of the switching elements S1 to S4 one by one at four timing of t1, t2, t3, and t4 that are shown hereinafter. The timing of T5 shown in FIG. 3 and FIG. 5 is equivalent to the section of t1 to t4.

Vcr shown in FIG. 9 is voltage across both ends of the capacitor C1 connected between the collector and the emitter of the switching elements S1 and S2, and Vcs is voltage across both ends of the capacitor C2 connected between the collector and the emitter of the switching elements S3 and S4. In addition, Ir is current that flows through R phase, and Is is current that flows through S phase.

To begin with, the switching control circuit 4 switches the switching element S4 from the OFF state to the ON state at timing t1 immediately after the timing T5 shown in FIG. 3 and FIG. 5. Since current is not flowing through S phase at the time of switching of the state of the switching element S4 (Is=0), the switching of the state of the switching element S4 at the t1 is performed in the zero current sequence (ZCS). In other words, the switching of the state of the switching element S4 at the t1 is performed by soft switching. Moreover, the switching element S4 has been switched to the ON state, which causes the current Is that flows through the S phase to be increased and, with the increase, causes the current Ir that flows through the R phase to be decreased. Furthermore, the discharge of the capacitor C2 is started at this timing.

Subsequently, the switching control circuit 4 switches the switching element S2 from the ON state to the OFF state at timing t2. Since the voltage across both ends of the capacitor C1 is 0 V at the time of switching of the state of the switching element S2, the switching of the state of the switching element S2 at the t2 is performed in the zero voltage sequence (ZVS). In other words, the switching of the state of the switching element S2 at the t2 is performed by soft switching. Additionally, the switching element S2 has been switched to the OFF state, which causes the current Ir of the R phase to be zero and also causes the charge of the capacitor C1 to be started.

The switching control circuit 4 switches the switching element S3 from the OFF state to the ON state at timing t3. Since the voltage across both ends of the capacitor C2 is 0 V at the time of switching of the state of the switching element S3, the switching of the state of the switching element S3 at the t3 is performed in the zero voltage sequence (ZVS). In other words, the switching of the state of the switching element S3 at the t3 is performed by soft switching.

It is to be noted that the capacity of the capacitors C1 to C6 is set to a magnitude required to complete the discharge between t1 and t3 and to complete the charge between t2 to t3, based on the resonant frequency of the resonant circuit 3 and the magnitude of the load of the load circuit 10. In practice, the capacity of the capacitors C1 to C6 is set to be large enough to complete the charge and discharge between t2 and t3.

The switching control circuit 4 switches the switching element S1 from the ON state to the OFF state at timing t4. Since current is not flowing through the R phase at the time of switching of the state of the switching element S1 (Ir=0), the switching of the state of the switching element S4 at the t4 is performed in the zero current sequence (ZCS). In other words, the switching of the state of the switching element S1 at the t4 is performed by soft switching.

In this way, all the switching of the states of the switching elements S1 to S12 relating to the commutation operation of the power conversion circuit 2 is performed by soft switching and is not performed by hard switching. Moreover, the switching control circuit 4 prevents a short circuit of the power source and secures a path in which load current flows back by switching the states of the switching elements S1 to S4 one by one at the four timing, t1, t2, t3, and t4.

Furthermore, while, in the description relating to FIGS. 7A, 7B, 7C, 8A, 8B, and 9, the switching of the states of the switching elements S1 to S12, relating to the commutation operation of the power conversion circuit 2 at the specific timing T5 has been described, all the switching of the states of the switching elements S1 to S12, relating to the commutation operation of the power conversion circuit 2 at other timing T1, T2, T3, T4, and T6 is also performed by the similar switching method, that is, by soft switching, and is not performed by hard switching.

Accordingly, the switching loss is able to be significantly reduced and the conversion efficiency is able to be improved. In addition, since the stress on the switching elements S1 to S12 is able to be reduced, improvement in reliability is able to be achieved.

Moreover, while, in the above description, the output of the power conversion circuit 2 is set to be single-phase AC voltage, the output may be set to multiphase AC voltage. For example, in a case in which the output is set to an AC power source of three phases of U, V, and W, the power conversion circuit 2 further includes three more bidirectional switches connected to each phase R, S, and T of the three phase AC power source as an input power source (which means the power conversion circuit 2 is provided with the total of nine bidirectional switches), and the interphase voltage of which the phases are shifted by ⅔π (120 degrees) from each other may be outputted as three phases of U, V, and W. In such a case, the resonant circuit 3 is provided in each phase of U, V, and W.

REFERENCE SIGNS LIST 1 power conversion device
2 power conversion circuit
3 resonant circuit
4 switching control circuit
5 transformer
10 load circuit
S1 to S12 switching element
D1 to D12 diode
C1 to C6, C31 capacitor
L31 coil

What is claimed is:
1. A power conversion device that converts AC to AC, comprising:
   a power conversion circuit that uses a multiphase AC power source as an input and has a plurality of bidirectional switches each of which is connected to each phase of the multiphase AC power source;
   a switching control circuit that controls states of the plurality of bidirectional switches and switches a combination of two phases of the multiphase AC power source, relating to an interphase voltage to be outputted from the power conversion circuit to a load side; and
   a resonant circuit that is connected to an output side of the power conversion circuit, wherein:
   at a time of switching of the combination of the two phases that output the interphase voltage to the load side, the switching control circuit switches the states of the plurality of bidirectional switches relating to the switching, by soft switching; and
   a resonant frequency of the resonant circuit is a same as a frequency of the interphase voltage outputted from the power conversion circuit to the load side by controlling the states of the plurality of bidirectional switches by the switching control circuit.

2. The power conversion device that converts AC to AC according to claim 1, wherein the power conversion circuit has a capacitor that is connected in parallel to the plurality of bidirectional switches.

3. The power conversion device that converts AC to AC according to claim 2, wherein:
   the plurality of bidirectional switches each have two switching elements that are connected in reverse parallel to each other; and
   the capacitor is connected between a collector and an emitter of the switching elements.

4. The power conversion device that converts AC to AC according to claim 2, wherein:
   the plurality of bidirectional switches each have two switching elements that are connected in reverse parallel to each other;
   the capacitor is connected between a collector and an emitter of the switching elements; and
   the switching control circuit, at the time of switching of the combination of the two phases that output the interphase voltage to the load side, sequentially switches states of the switching elements included in the plurality of bidirectional switches relating to the switching, by the soft switching.

* * * * *

UNITED STATES PATENT AND TRADEMARK OFFICE
CERTIFICATE OF CORRECTION

PATENT NO. : 9,973,101 B2
APPLICATION NO. : 15/116539
DATED : May 15, 2018
INVENTOR(S) : Satoshi Ogasawara, Agnes Hadinata and Takashi Hyodo It is certified that error appears in the above-identified patent and that said Letters Patent is hereby corrected as shown below:

On the Title Page

The second assignee's name should be corrected to show Omron Corporation.

Signed and Sealed this
Seventeenth Day of July, 2018

Andrei Iancu
*Director of the United States Patent and Trademark Office*